Patented Aug. 15, 1939

2,169,515

UNITED STATES PATENT OFFICE 2,169,515

CARBOXYLIC ACID ESTERS OF AROMATIC SULPHOCARBOXYLIC ACIDS WITH HYDROXY-ALKYLAMIDES AND PROCESS OF MAKING SAME

Otto Albrecht, Basel, Switzerland, assignor to Society of Chemical Industry in Basle, Basel, Switzerland No Drawing. Application October 8, 1937, Serial No. 168,085. In Switzerland October 17, 1936

12 Claims. (Cl. 260—401)

It has been found that valuable derivatives of organic carboxylic acids can be obtained by first esterifying in an organic sulphocarboxylic acid one carboxyl group by treatment of the free sulphonic acid or sulphonic acid salt of the organic carboxylic acid or a substitution product thereof, or an anhydride, halide or ester thereof with N-hydroxy-alkylamides which contain at least 8 carbon atoms, and then neutralizing any free carboxyl group which may still exist in the monoester thus obtained or by performing this conversion of the carboxyl groups in the reverse order of succession.

The conversion of the carboxyl-group may, for example, be performed by heating the free sulphonic acid or a salt thereof with a hydroxy-compound, if required in the presence of a solvent such as pyridine, quinoline, dimethyl-para toluidine or the like. The carboxylic anhydrides or chlorides react particularly easily. It is also possible to form the carboxylic acid chloride only during the reaction, for example with the aid of phosphorous trichloride. The carboxylic acid esters of aromatic sulphocarboxylic acids may be esterified with a hydroxy-compound. The esterification may occur in presence of an agent promoting esterification, such as concentrated sulphuric acid, hydrogen chloride gas, and so on. Esterification is facilitated by removing the water which is formed in the reaction from the esterification mixture in known manner, for example with the assistance of a substance which forms with water an azeotropic mixture. The liberated water may also be removed by operation under reduced pressure.

For the conversion of the first carboxyl-group of sulphodi-carboxylic acids into a mono-ester, there will be used a molecular proportion of the hydroxy-compound for one molecular proportion of the sulphonic acid or sulphonate or the anhydride, halide or ester thereof. For the conversion of the second carboxyl-group of sulphodicarboxylic acids into an ester group the alcohol may be used in excess.

As parent materials there are suitable aliphatic, hydroaromatic, aromatic or heterocyclic sulphocarboxylic acids, for example sulpho-acetic acid, sulpho-butyric acid, sulphosuccinic acid, sulphonaphthenic acids, sulphobenzoic acid, sulphosalicylic acid, the sulphonic acids of phthalic acid, isophthalic acid or naphthalic acid or their anhydrides, phthalic acid disulphonic acid, sulphoterephthalic acid and sulpho-4-chlorophthalic acid. The N-hydroxyalkylamides used for esterifying one of the carboxyl groups may be derived from aliphatic mono-hydroxyamines or polyhydroxyamines, such as ethanolamine, diethanolamine or glucamine which are acylated with aliphatic or cycloaliphatic carboxylic acids, for example naphthenic acids, and still contain at least one free hydroxyl-group. Such products are, for example, N-hydroxyethylundecylenic acid amide, N-hydroxyethyllauric acid amide, N-hydroxyethylpalmitic acid amide, stearic acid glucamide, N:N-dihydroxydiethyllauric acid amide and N-dihydroxypropyllauric acid amide.

For neutralizing the second carboxyl-group of sulphodicarboxylic acid mono-esters there may be used an oxide, hydroxide or carbonate of a monovalent or polyvalent metal, especially of an alkali metal, or an organic base such as cyclohexylamine or triethanolamine.

The sulphonic acid group linked to a hydrocarbon residue which in some cases may be substituted may be present in the form of a salt of a mono- or poly-valent metal. It may also be neutralized with ammonia or with an amine before or after the conversion of one or both carboxyl-groups.

The products obtainable by the present invention are applicable by reason of their properties of capillary activity as assistants in the textile industry, for example as wetting, cleansing, washing, dispersing, equalising or softening agents, also in particular as foaming agents, for example for fire-extinguishing purposes. They may be used alone or together with other suitable substances such as solvents, salts of monovalent or polyvalent metals, soaps or substances resembling soaps or protective colloids.

The following examples illustrate the invention the parts being by weight unless otherwise stated, and the relationship of parts by weight to parts by volume being that of the kilo to the litre.

*Example 1*

14.5 parts of 4-sulphophthalic anhydride are heated to 70° C. and 15 parts of molten hydroxyethyllauric acid amide are gradually introduced drop by drop at 70–90° C. whilst stirring. Stirring is continued for a short time until the reaction product dissolves in water to a clear solution. The esterification product thus obtained is dissolved in water having a temperature of about 45° C. and the solution is neutralized by means of a solution of potassium hydroxide and evaporated to dryness, preferably under reduced pressure. In the dry state the potassium salt is practically colorless; its aqueous solutions form a dense stable foam. The product is, therefore, suitable as a shampoo. It is also useful for producing an air-foam for extinguishing fires, especially in the processes in which the foam formation occurs by the effective force of a stream of water under pressure.

*Example 2*

1.35 parts of finely powdered sodium formate are added gradually to 22 parts of 4-sulphophthalic anhydride containing about 8 per cent of sulphuric acid or sulphur trioxide at 65–85° C. and the mixture is maintained for about one hour at 85–90° C. whilst stirring. The temperature is then allowed to fall to 70° C. and whilst stirring 20 parts of molten N-hydroxyethylamide of coconut oil fatty acid, which is easily obtainable, for example from coconut oil by means of monoethanolamine, are gradually added in small portions, the temperature meanwhile being kept at about 70–90° C. After further stirring for a short while, about 80 parts of water are added, the whole is neutralized by the addition of a concentrated solution of potassium hydroxide at a temperature below about 30° C. and then evaporated to dryness advantageously under reduced pressure. There is obtained a solid mass which can easily be powdered and readily dissolves in water to a solution which foams strongly when shaken. The product so obtained is useful as a shampoo either as a powder or in the form of a solution. Instead of the N-hydroxyethylamide of coconut oil fatty acid there may be used the hydroxyethylamide of undecylenic acid or of a naphthenic acid which are easily obtainable, for example, from mono-ethanolamine and the corresponding carboxylic acid chlorides. Instead of 4-sulphophthalic anhydride there may be used 3-sulphobenzoic acid chloride, sulphoterephthalic acid or sulphosuccinic acid.

*Example 3*

3.5 parts of molten coconut fatty acid N-hydroxyethylamide having a temperature of about 75–80° C. are gradually introduced into 5 parts of disulphophthalic anhydride at 70–90° C. whilst stirring. Stirring is continued for a short time longer and the reaction mass is then cooled and dissolved in water and neutralized with a concentrated solution of potassium hydroxide. By evaporating the neutralized solution to dryness there is obtained a solid mass which can be powdered and dissolves in water to a solution which foams strongly.

*Example 4*

40 parts of molten coconut fatty acid hydroxyethylamide having a temperature of about 75–80° C. are introduced in the course of about 30 minutes into 60 parts of 4-sulphophthalic anhydride which contains about 8 per cent of sulphuric acid or sulphur trioxide and has been neutralized by sodium formate, the temperature being maintained at about 80–100° C. The whole is stirred for a short time longer, 27 parts of gycerine are added and stirring is continued at 85–90° C. for about 30 minutes. After heating for about 1 hour in a boiling water bath the mass is allowed to cool, dissolved in water and neutralized with a concentrated solution of potassium hydroxide. By evaporating the neutralized solution to dryness there is obtained a solid mass which dissolves in water to a solution which foams strongly when shaken.

What I claim is—

1. A process for the manufacture of carboxylic acid esters of aromatic sulphocarboxylic acids of the benzene series, consisting in reacting a member selected from the group of compounds consisting of the aromatic sulphocarboxylic acids, their esters, salts, anhydrides and halides with hydroxy alkylamides of such carboxylic acids which contain at least 8 carbon atoms and which are difficultly soluble in water.

2. A process for the manufacture of carboxylic acid esters of aromatic sulpho-ortho-dicarboxylic acids of the benzene series, consisting in reacting a member selected from the group of compounds consisting of the aromatic sulpho-ortho-dicarboxylic acids, their esters, salts, anhydrides and halides with hydroxy alkylamides of such carboxylic acids which contain at least 8 carbon atoms and which are difficultly soluble in water.

3. A process for the manufacture of carboxylic acid esters, of aromatic sulpho-ortho-dicarboxylic acids of the benzene series consisting in reacting a member selected from the group of compounds consisting of the 4-sulphophthalic acid, its esters, salts, anhydrides and halides, with hydroxy alkylamides of such carboxylic acids which contain at least 8 carbon atoms and which are difficultly soluble in water.

4. A process for the manufacture of carboxylic acid esters of aromatic sulpho-ortho-dicarboxylic acids of the benzene series, consisting in reacting a member selected from the group of compounds consisting of the 4-sulphophthalic acid, its esters, salts, anhydrides and halides, with hydroxy alkylamides of such aliphatic carboxylic acids which contain at least 8 carbon atoms and which are difficultly soluble in water.

5. A process for the manufacture of carboxylic acid esters of aromatic sulpho-ortho-dicarboxylic acids of the benzene series, consisting in reacting a member selected from the group of compounds consisting of the 4-sulphophthalic acid, its esters, salts, anyhdrides and halides, with lauric acid hydroxy ethylamide.

6. A process for the manufacture of carboxylic acid esters of aromatic sulpho-ortho-dicarboxylic acids of the benzene series, consisting in reacting a member selected from the group of compounds consisting of the 4-sulphophthalic acid, its esters, salts, anhydrides and halides, with coconut oil fatty acid hydroxy ethylamide.

7. The carboxylic acid esters of aromatic sulphocarboxylic acids of the benzene series with hydroxy alkylamides of such carboxylic acids which contain at least 8 carbon atoms and which are difficultly soluble in water, which products, in the form of their dried alkali salts, constitute colorless to light-colored powders which dissolve in water to form solutions of great foaming capacity.

8. The carboxylic acid esters of aromatic sulpho-ortho-dicarboxylic acids of the benzene series with hydroxy alkylamides of such carboxylic acids which contain at least 8 carbon atoms and which are difficultly soluble in water, which products, in the form of their dried alkali salts, constitute colorless to light-colored powders which dissolve in water to form solutions of great foaming capacity.

9. The carboxylic acid esters of 4-sulphophthalic acid with hydroxy alklyamides of such carboxylic acids which contain at least 8 carbon atoms and which are difficultly soluble in water, which products, in the form of their dried alkali salts, constitute colorless to light-colored powders which dissolve in water to form solutions of great foaming capacity.

10. The carboxylic acid esters of 4-sulphophthalic acid with hydroxy alkylamides of such aliphatic carboxylic acids which contain at least 8 carbon atoms and which are difficultly soluble in water, which products, in the form of their dried alkali salts, constitute colorless to light-colored powders which dissolve in water to form solutions of great foaming capacity.

11. The carboxylic acid esters of 4-sulphophthalic acid with lauric acid hydroxyethylamide, which products, in the form of their dried alkali salts, constitute colorless to light-colored powders which dissolve in water to form solutions of great foaming capacity.

12. The carboxylic acid esters of 4-sulphophthalic acid with coconut oil fatty acid hydroxyethylamide, which products, in the form of their dried alkali salts, constitute colorless to light-colored powders which dissolve in water to form solutions of great foaming capacity.

OTTO ALBRECHT.